May 24, 1960    G. O. SULLIVAN    2,937,772
DOLLY FOR TOWING DISABLED VEHICLES
Filed March 19, 1957    3 Sheets-Sheet 1

INVENTOR:
Glenn O. Sullivan
By Smyth & Roston
Attorneys

May 24, 1960

G. O. SULLIVAN 2,937,772

DOLLY FOR TOWING DISABLED VEHICLES

Filed March 19, 1957

INVENTOR:
Glenn O. Sullivan

By Smyth & Roston
Attorneys

May 24, 1960 G. O. SULLIVAN 2,937,772
DOLLY FOR TOWING DISABLED VEHICLES
Filed March 19, 1957 3 Sheets-Sheet 3
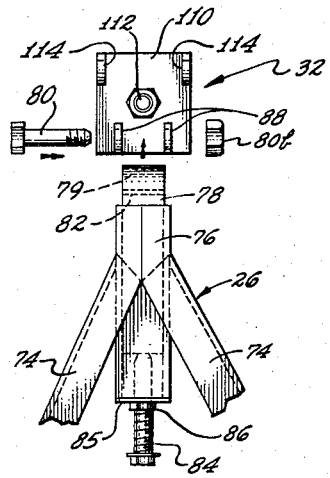
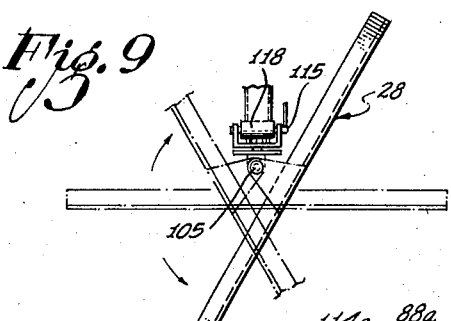
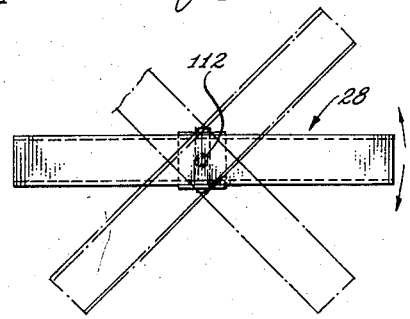
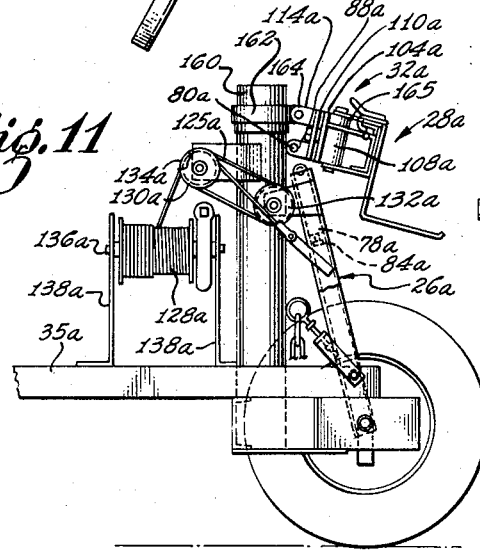
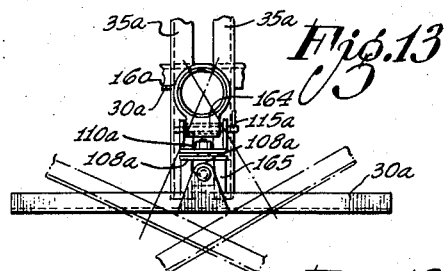
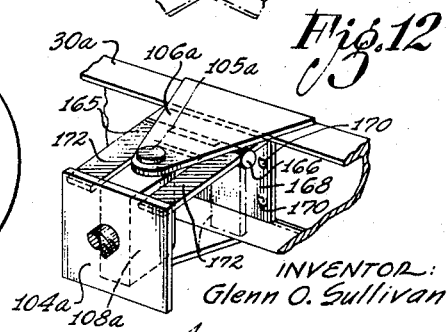
INVENTOR:
Glenn O. Sullivan
By Smyth & Roston
Attorneys United States Patent Office 2,937,772
Patented May 24, 1960

2,937,772

DOLLY FOR TOWING DISABLED VEHICLES

Glenn O. Sullivan, Inglewood, Calif., assignor to All-Ace, Inc., Inglewood, Calif., a corporation Filed Mar. 19, 1957, Ser. No. 647,049

18 Claims. (Cl. 214—86)

This invention relates to means to tow a disabled automotive vehicle and, more particularly, is directed to a dolly which may be connected either to a pick-up truck or to an ordinary passenger automobile to tow a disabled vehicle.

A tow dolly used for this purpose should carry the weight imposed thereon by the disabled vehicle without transmitting any substantial portion of the load to the leading towing vehicle. It is also desirable to protect the leading towing vehicle from shocks involved in the acceleration and deceleration of the disabled vehicle. The invention meets these two requirements by providing a two-wheeled tow dolly constructed to carry the weight of the leading end of the disabled vehicle at a point substantially above the level of the axis of the two dolly wheels.

With this arrangement, the weight of the disabled vehicle is imposed to major extent on the dolly wheels instead of on the towing automobile, the load point being just forward of the axis of the dolly wheels to make the tow dolly stable during the towing operation. No special shock absorbing means is needed because the load of the disabled vehicle is carried by the dolly at a level that is a substantial distance above the axis of the dolly wheels. Thus, when the brakes of the towing vehicle are applied to decelerate the disabled vehicle, the consequent forward thrust by the disabled vehicle rocks the tow dolly forward about the axis of its two wheels to apply a downward force to the rear of the towing vehicle and its downward force is cushioned by the springs of the towing vehicle. In like manner, the opposite pull by the disabled vehicle that is created by abrupt acceleration of the towing vehicle is cushioned by the transmission of a lifting force to the rear of the towing vehicle. Thus, the invention utilizes the spring suspension of the towing vehicle itself to absorb towing shocks.

This concept of using a two-wheeled towing dolly of the character described to carry the weight of the disabled vehicle at a relatively high point slightly forward of the dolly wheels incurs the problem of lifting and maneuvering the disabled vehicle into the elevated towing position. In this regard, a feature of the invention is the inclusion in the dolly frame of a hinged lift frame together with means pivotally mounted on the swinging end of the lift frame for fixedly engaging one end of the disabled vehicle. Suitable actuating means swings a lift frame from a rearward lower position near ground level to a forward upper position thereby carrying the vehicle-engaging means to the desired upper towing position.

Suitable means is provided to maintain the vehicle-engaging means at its towing position for the towing operation. In the preferred practice of the invention, the dolly frame has a fixed upwardly extending portion for this purpose, to which portion the vehicle-engaging means is releasably anchored at its upper towing position. Thus, in the preferred practice of the invention, at least a part of the weight imposed by the disabled vehicle is transferred from the hinged lift frame to the fixed upwardly extending portion of the dolly frame for increased safety during the towing operation.

The vehicle-engaging means should have a universal pivotal connection with the lift frame for adapting itself to the changing relative positions of the disabled vehicle during the lifting operation and thereafter at its towing position should be universally movable relative to the dolly frame to accommodate the changes in the relative position of the disabled vehicle that are involved in the towing operation. For this purpose, the preferred practice of the invention provides a vehicle-engaging means in combination with a universal joint assembly for connection with the lift frame and for releasable connection with the fixed upwardly extending portion of the dolly frame.

A feature of one practice of the invention is a rotary support on the fixed upwardly extending portion of the dolly frame to support a relatively heavy disabled vehicle such as a truck, the rotary support having an upright axis of rotation. When the end of the heavy vehicle is elevated to the towing position, the universal joint assembly of the vehicle-engaging means is engaged with this rotary support and disengaged from the lift frame. Thereafter, the universal joint assembly is immobilized with respect to rotation about its upright axis so that such rotation is taken over by the rotary support.

Another feature of the preferred practice of the invention is the provision of brakes for the tow dolly in combination with safety means to apply the brakes automatically whenever the tow dolly accidentally breaks loose from the towing vehicle. A further feature, as will be explained, is the use of a pair of wheels for the tow dolly each of which has a pair of tires thereon, the wheel being reversible to place either tire on the outer side of the wheel.

The various features and advantages of the invention will be apparent from the following detailed description, considered with the accompanying drawings.

In the drawings, which are to be regarded as merely illustrative:

Figure 8 is an exploded view showing the manner in which the lift frame is connected to the universal joint assembly and also showing how the lift frame is constructed for adjustable extension;

Figure 9 is a fragmentary plan view showing how the universal joint assembly permits the vehicle-engaging means to swing about an upright axis;

Figure 10 is a fragmentary elevational view showing how the universal joint assembly permits the vehicle-engaging means to swing about a longitudinal axis;

Figure 11 is a fragmentary side elevation similar to Figure 2 showing the construction of a second embodiment of the invention that may be used for towing relatively heavy disabled vehicles such as trucks;

Figure 12 is a perspective view showing how means may be employed to immobilize the universal joint assembly of Figure 11 with respect to rotation about its upright axis; and Figure 13 is a fragmentary plan view showing how the use of the immobilizing means shown in Figure 12 causes the vehicle-engaging means to rotate about an alternate upright axis provided by a rotary support on the dolly frame.

Figure 2:
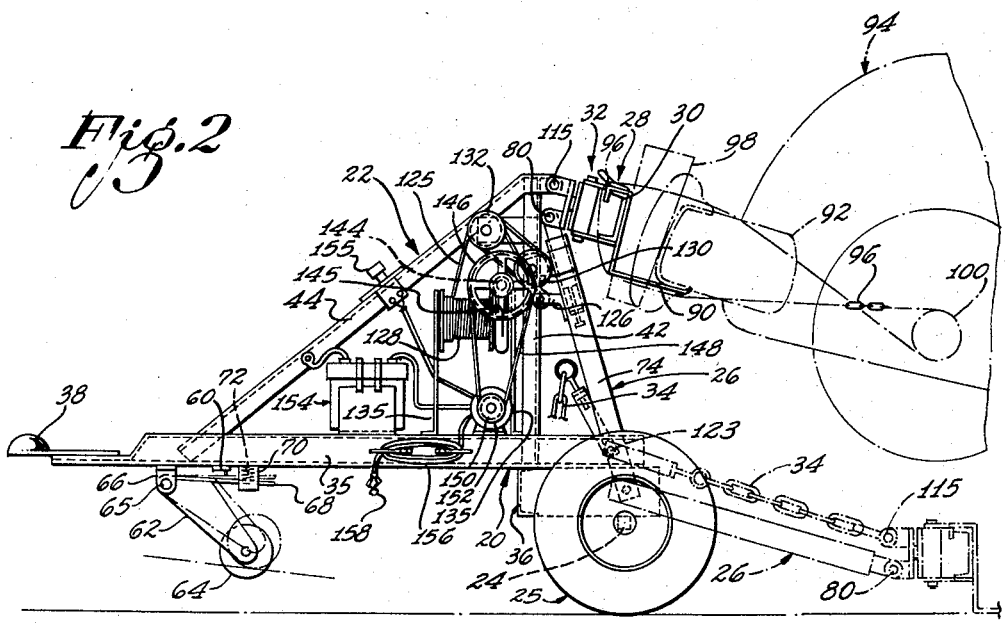
Figure 2 is a side elevation of the dolly at the position taken for actually towing a passenger automobile, such as an automobile being shown in phantom.

The principal parts of the first embodiment of the invention include: a dolly frame, generally designated by numeral 20, having a fixed upwardly extending portion, generally designated by numeral 22; a transverse axle 24; two ground wheels, each generally designated by numeral 25, on opposite ends of the axle 24; a lift frame, generally designated by numeral 26, that is included in the dolly frame and is hingedly mounted to swing between a lower rearwardly extending position shown in broken lines in Figure 2 and an upper towing position shown in solid lines; vehicle-engaging means, generally designated by numeral 28, which includes a transverse channel member 30; a universal joint assembly, generally designated by numeral 32, by means of which the vehicle-engaging means 28 is pivotally mounted on the swinging end of the lift frame 26; and what may be termed a limiting chain 34 that is releasably attachable to the vehicle-engaging means 28 to limit rearward downward rotation of the vehicle-engaging means when the lift frame 26 is swung downward in preparation for engagement with the end of a disabled vehicle.

The base portion of the dolly frame 20 comprises a pair of closely spaced longitudinal channel members 35 and a U-shaped transverse frame member 36 that is rigidly attached to the two longitudinal channel members on the underside thereof. The forward ends of the two longitudinal channel members 35 merge together and are welded to a trailer hitch 38 by means of which the dolly may be coupled to a towing automobile (not shown). The two arms of the U-shaped frame member 36 rest on the axle 24 to support the trailing end of the dolly frame and these two arms are preferably reinforced by short channel members 40. The fixed upwardly extending portion 22 of the dolly frame may comprise an upright channel member 42 that is attached at its lower end both to the longitudinal channel members 35 and the U-shaped frame member 36. This upright channel member 42 is braced by a diagonal channel member 44 that extends upwardly and rearwardly from the two longitudinal channel members 35.

Figure 4:
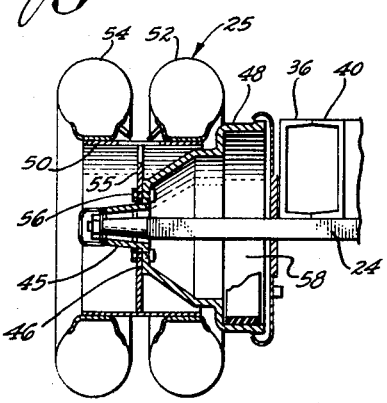
Figure 4 is a sectional view of one of the reversible dual-tire wheels of the dolly.

Preferably, each of the two ground wheels 25 is constructed as indicated in Figure 4. Each of the ground wheels includes a hub structure 45 that is suitably journaled on the end of the axle 24 and this hub structure is shaped to provide a vertical annular face 46 and also a brake drum 48. A wheel cylinder 50 carrying a pair of tires 52 and 54 has an integral inner central web for releasable attachment to the hub face 46 by suitable bolts 56. It is apparent that the wheel cylinder 50 is reversible on the hub face 46 so that the wheel cylinder may be removed, turned around, and reassembled to change the relative positions of the two tires 52 and 54. Thus, if the tire that is on the outer side of the wheel becomes flat, the wheel may be reversed to place the flat tire on the inner side of the wheel.

The dolly is equipped with conventional electric brakes which includes individual brake assemblies 58 inside the two brake drums 48, respectively. The electric brakes may be electrically controlled in a well known manner by the driver of the towing vehicle. In this regard, a feature of the preferred practice of the invention is the provision of a safety switch 60 (Figure 2) to apply the electric brakes automatically whenever the dolly accidentally becomes unhitched from the towing vehicle.

As shown in Figure 2, the safety switch 60 may be operated by a downwardly extending bracket 62 that carries a caster 64 for contact with the ground whenever failure of the coupling with the towing vehicle permits the forward end of the dolly frame to drop from its normal towing position. The bracket 62 is pivotally connected by a pin 65 to a pair of ears 66 on the underside of the dolly frame. To limit the downward movement of the bracket 62, the bracket has a rearwardly directed arm 68 that extends through a stirrup or U-shaped guide bracket 70. A suitable spring 72 in compression between the arm 68 and the underside of the dolly frame urges the caster bracket 62 towards its lower limit position with the arm 68 resting on the guide bracket 70. If the forward end of the dolly frame is disconnected from the towing vehicle, it will drop to bring the caster 64 into contact with the ground with consequent actuation of the switch 60 by the bracket 62 for automatic application of the dolly brakes. It is apparent that the safety switch 60 serves a useful function apart from its emergency use in that it causes the tow dolly to be immobilized automatically whenever the tow dolly is disconnected from the towing vehicle.

Figure 1:
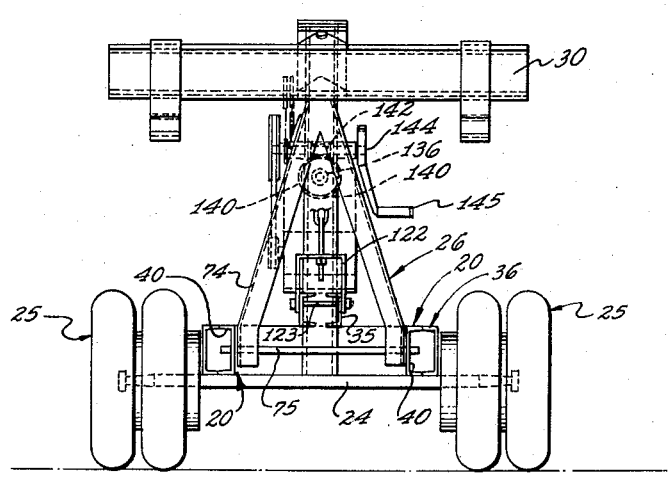
Figure 1 is a rear end elevation of an embodiment of the dolly that is suitable for towing passenger automobiles, the lift frame of the dolly being in its upper forward position.

The lift frame 26 may be a V-shaped frame made of a pair of channel members 74 and, as shown in Figure 1, may be hingedly mounted by means of a cross rod 75 having its opposite ends anchored in the two short reinforcement channels 40. As best shown in Figure 8, the swinging end of the lift channel 26 incorporates a sleeve or socket member 76 of rectangular cross-sectional configuration in which a shank member 78 is slidingly mounted to serve as an extension of the lift frame. The outer end of the shank member 78 has a cross bore 79 to serve as a bearing for a pivot bolt 80. Preferably, the cross bore 79 is provided with roller bearing means 82 for rotatable engagement with the pivot bolt 80. By virtue of this construction, the lift frame 26 is longitudinally extensible in that the shank member 78 is movable to vary the effective length of the lift frame i.e. the distance between the axis of the cross rod 75 and the axis of the roller bearing means 82.

The normal gravitational position of the shank member 78 is determined by a stop screw 84 against which the inner end of the shank member rests. The stop screw 84 is threaded through an end wall 85 of the socket member 76 and is releasably secured by a lock nut 86. The stop screw 84 may be adjusted initially for accurate positioning of the roller bearing means 79 to permit the pivot bolt 80 to pass through a pair of lower ears 88 of the universal joint assembly 32 when the lift frame 26 is in its upper towing position, and thereafter the stop screw may be adjusted to compensate for wear as may be required.

Figure 7:
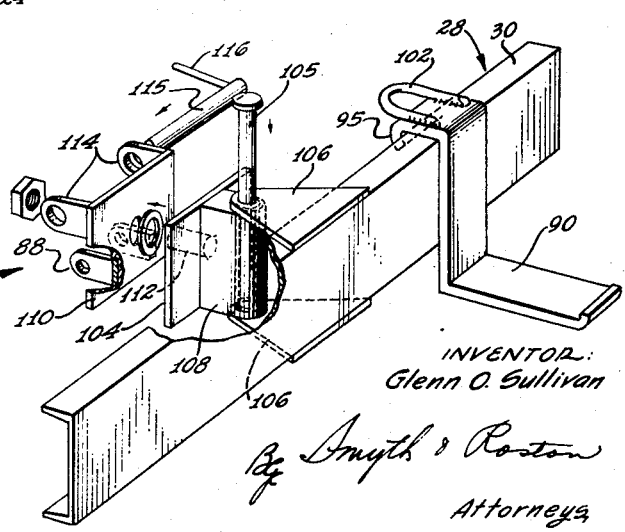
Figure 7 is an exploded perspective view showing parts of the universal joint assembly that connects the vehicle-engaging means with the lift frame.

The vehicle-engaging means 28 which includes the previously mentioned transverse channel member 30 also includes a pair of angular arms 90 to engage one end of a disabled vehicle from below. For example, the two angular arms 90 may extend under the rear bumper 92 of a disabled automobile 94 that is shown in phantom in Figure 2. As best shown in Figure 7, each of the angular arms 90 may be formed with an upper hook end 95 for sliding engagement with the channel member 30 whereby the spacing between the two angular arms may be varied as desired.

The vehicle-engaging means 28 further includes a pair of chains 96 for rigidly securing the disabled automobile 94 in position on the angular arms 90 against the channel member 30. If the disabled vehicle 94 has a trailer hitch that extends rearward slightly beyond the rear bumper 92, a pair of wooden wedges 98 may be inserted to provide clearance between the rear bumper and the channel member 30. If the disabled vehicle does not have such a trailer hitch the wooden wedges are not used and the two chains 96 hold the rear bumper snugly against the face of the channel member 30. The two chains 96 may extend around the rear axle 100 of the disabled vehicle as indicated in Figure 2. Preferably, the angular arms 90 have metal loops 102 welded thereto, as shown in Figure 7, and the two chains 96 extend through these metal loops, respectively.

The universal joint assembly 32 that pivotally supports the vehicle-engaging means 28 may be of any suitable construction that will provide the required freedom of relative movement on the part of the vehicle-engaging means. In the present construction, as best shown in Figure 7, the channel 30 of the vehicle-engaging means is pivotally connected to a first upright plate 104 by a pivot bolt 105 which provides the upright axis of rotation of the universal joint assembly. The pivot bolt 105 extends through a pair of ears 106 on the channel member 30 and through a bore in a bearing block 108 that is united with the upright plate 104 on the rear face thereof.

The first upright plate 104 is pivotally connected face-to-face with a second upright plate 110 by means of a longitudinal pivot bolt 112 (Figure 8) that provides the longitudinal axis of rotation of the universal joint assembly. The front face of the second upright plate 110 is provided with the previously mentioned lower ears 88 (Figure 7) for pivotal connection with the lift frame 26 and is also provided with a second upper pair of ears 114 to receive a removable pivot pin 115 having a convenient handle 116.

Figure 3:
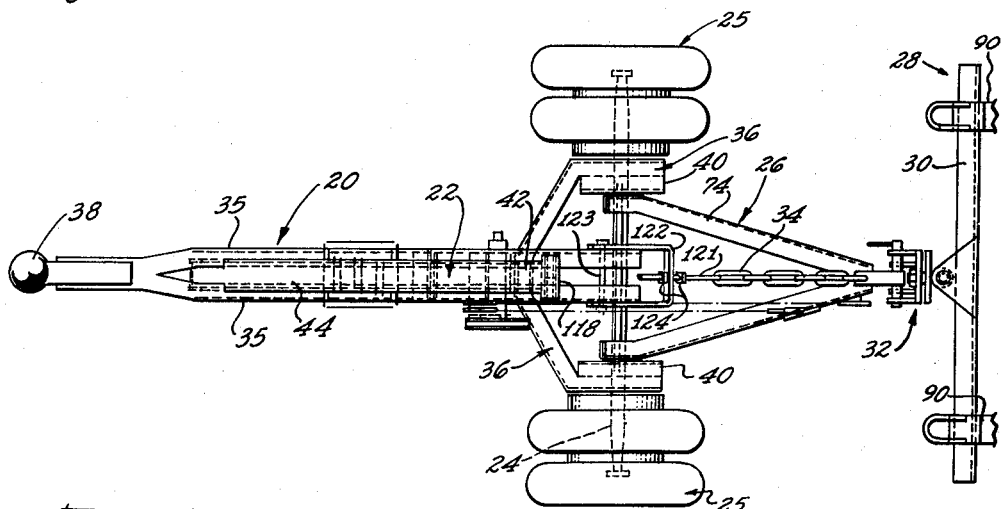
Figure 3 is a plan view of the dolly with the lift frame lowered in preparation for lifting an end of a disabled vehicle into towing position.
Figure 5:
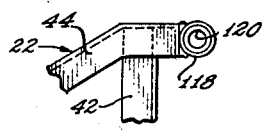
Figure 5 is a view showing a bearing in end elevation, which bearing is employed for pivotally connecting the vehicle-engaging means with the fixed portion of the dolly frame for a towing operation.
Figure 6:
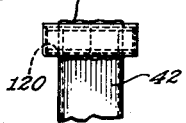
Figure 6 is a similar view showing the bearing in side elevation.

When the lift frame 26 is in its upper towing position shown in Figure 2, the removable pivot pin 115 extends through a bearing sleeve 118 (Figures 5 and 6) that is fixedly mounted on the fixed upwardly extending portion 22 of the dolly frame to connect the second upright plate 110 pivotally to the dolly frame. Preferably, the bearing sleeve 118 incorporates suitable roller bearing means 120 for contact with the removable pivot pin 115. On the other hand, when the lift frame 26 is lowered from its upper limit position in preparation for engagement with the end of a disabled vehicle, the removable pivot pin 115 is employed in the ears 114 for pivotally connecting the universal joint assembly 32 to the previously mentioned limiting chain 34 as indicated in Figures 2 and 3. The second or forward end of the limiting chain 34 is connected by an eye-bolt 121 (Figure 3) to a yoke 122 that is in turn pivotally connected to the longitudinal channels 35 of the dolly frame by a pivot bolt 123. The effective length of the limiting chain 34 may be adjusted by nuts 124 on the eye-bolt 121.

When the lift frame 26 is in a lower position as shown in broken lines in Figure 2, the pivot bolt 80 that extends through the lower ears 88 to connect the second upright plate 110 to the lift frame provides the transverse axis of rotation of the universal joint assembly 32. At this time, the removable pivot pin 115 is connected to the limiting chain 34 to hold the vehicle-engaging means 28 upright. On the other hand, when the lift frame 26 is in its upper towing position, shown in solid lines in Figure 2, the removable pivot pin 115 is in service to connect the ears 114 with the fixed bearing sleeve 118 and at this time the transverse axis of rotation of the universal joint assembly 32 is provided by the removable pin 115, the axis provided by the pivot bolt 80 being secondary. The previously described shank member 78 is slidable to permit arcuate movement of the lower pivot bolt 80 about the axis of the removable pin 115 without binding action when the disabled car is being towed to its destination.

When the vehicle-engaging means 28 is fixedly engaged with a disabled vehicle as indicated in Figure 2, the angular position of the vehicle-engaging means with respect to rotation about its transverse axis is governed by the disabled vehicle. Thus, during the lifting operation by the lift frame 26, the rigid connection of the disabled vehicle with the vehicle-engaging means governs the rotary position of the vehicle-engaging means with respect to the axis of the pivot bolt 80 and during the subsequent towing operation, the vehicle in the same manner governs the rotary position of the vehicle-engaging means with respect to the removable pivot pin 115.

It is apparent that some provision should be made to control the angular position of the vehicle-engaging means relative to the pivot bolt 80 when a vehicle is not rigidly connected with the vehicle-engaging means, and especially when the lift frame is lowered for maneuvering the vehicle-engaging means into contact with the end of a disabled vehicle. The limiting chain 34 serves this purpose. As indicated in broken lines in Figure 2 where the lift frame 26 is lowered close to the ground, the limiting chain 34 is substantially parallel with the lift frame and of approximately the same length. Thus, the limiting chain and the lift frame function as parallel arms to maintain the vehicle-engaging means 28 in approximately an upright position when the lift frame is in a lower range of positions.

Various means may be employed in various practices of the invention to actuate the lift frame 26. In this particular embodiment of the invention, one end of a cable 125 is anchored to a bracket 126 on the lift frame 26 for actuation by a winch 128. The cable 125 extends from the lift frame to a pulley 130 and then extends to a second pulley 132 from which it passes around a third pulley 134 to the winch, the third pulley 134 being on the same axis as the first pulley. The winch 128 is mouted on an actuating shaft 136 that is journaled in a pair of stanchions 138 and this shaft carries a worm gear 140 (Figure 1) in mesh with a worm 142. The worm 142 is mounted on a suitably journaled shaft 144 that removably carries a crank 145 by means of which the lift frame 26 may be manually raised and lowered.

A feature of the preferred practice of the invention is the further provision of power means to actuate the winch 128. For this purpose, the shaft 144 that carries the crank also carries a relatively large sheave 146 which is connected by a belt 148 with a smaller drive sheave 150. The drive sheave 150 is carried by a motor 152 that is energized by a storage battery 154 and controlled by a push-button reversing switch 155. The motor 152 may be a conventional reversible motor of suitable horsepower. The motor 152 may also be energized by the storage battery of a disabled vehicle or the storage battery of the towing vehicle. For this purpose, the motor 152 is provided with a flexible electric cable 156 (Figure 2) having a suitable connector element, such as a clamp means 158 for electrically connecting the cable to the battery of either vehicle.

The manner in which the invention operates for its purpose, may be readily understood from the foregoing description. When the tow dolly is out of service and when the tow dolly is being towed to the location of a disabled vehicle, the lift frame 26 is ordinarily at its upper position with the vehicle-engaging means 28 anchored to the fixed upwardly extending portion 22 of the dolly frame by means of the removable pivot pin 115. When the location of the disabled vehicle is reached, the pivot pin 115 is removed to disengage the vehicle-engaging means 28 from the dolly frame and then the pivot pin 115 is again inserted in the ears 114 to connect the upper end of the limiting chain 34 to the vehicle-engaging means. The lift frame 26 may be then lowered either by means of the crank 145 with the limiting chain 34 functioning to keep the vehicle-engaging means 28 from rotating rearwardly and downwardly about the axis of the pivot bolt 80, or through suitable actuation of the motor 152.

With the lift frame 26 low enough for the angular arms 90 to pass under the bumper of the disabled car and with the angular arms adjusted on the transverse channel 30 at appropriate spacing, the dolly is backed up until the transverse channel 30 abuts the bumper of the disabled car. Then either the crank 145 is operated or the motor 152 is energized to lift the end of the disabled vehicle high enough for the operator to apply the chains 96 for the purpose of anchoring the disabled vehicle to the vehicle-engaging means 28. After the lift frame 26 has been employed as a jack in this manner for the installation of the chains 96, the lift frame 26 is again lowered until the disabled vehicle again rests on the ground and then the chains 96 are completely tightened for rigid engagement of the end of the disabled vehicle with the vehicle-engaging means. The limit chain 34 is disconnected from the vehicle-engaging means 28 by removal of the pivot pin 115 because after the chains 96 are tightened the vehicle-engaging means is under control of the disabled vehicle and the limiting chain 34 would interfere with that control.

With the disabled vehicle rigidly anchored to the vehicle-engaging means 28, the lift frame 26 is again elevated either by the crank 145 or by energization of the motor 152. One advantage of the described arrangement is that the motor may be used to swing the lift frame to approximate a desired position and then the crank may be used to move the lift frame by small increments for precise adjustment of the lift frame position. When the lift frame 26 is adjusted to its upper towing position, the removable pivot pin 115 is again installed to connect the vehicle-engaging means 28 with the fixed upwardly extending portion 22 of the dolly frame, the pivot pin being inserted in the previously mentioned bearing sleeve 118.

It is apparent that during the towing of the vehicle, the universal joint assembly 32 will permit rotation of the vehicle-engaging means 28 relative to the dolly frame about three different axes independently. One axis is provided by the removable pivot pin 115 in rotating engagement with the bearing sleeve 118 of the tow frame which permits up and down movement of the disabled vehicle. A second axis is the upright axis provided by the pivot bolt 105 which permits the vehicle-engaging means 28 to swing laterally as indicated in Figure 9 and as required for negotiating curves during the towing operation. The longitudinal pivot bolt 112 provides the third longitudinal axis for rotation of the vehicle-engaging means 28 through a range of angles as indicated in Figure 10 to permit the disabled vehicle to be canted sidewise relative to the tow dolly. When the disabled vehicle is towed to its destination, the pivot pin 115 is removed to free the vehicle-engaging means 28 from the fixed portion 22 of the dolly frame and then the crank 145 is operated to lower the disabled vehicle to the ground. The limiting chain 34 may then be connected to the vehicle-engaging means 28 by means of the pivot pin 115 before the chains 96 are removed to free the tow dolly from the disabled vehicle. It is apparent that thereafter the tow dolly may be employed as a jack during the work on the disabled vehicle if desired.

The second embodiment of the invention shown in Figures 11, 12 and 13 is largely identical with the first described embodiment as indicated by the use of corresponding numerals to indicate corresponding parts. This second embodiment is intended to be used for towing relatively heavy disabled vehicles such as trucks and therefore is designed to carry a greater load than the first embodiment. For this purpose, the previously described fixed upwardly extending portion 22 of the dolly frame is replaced by a heavy cylindrical column 160. The column 160 carries what may be termed a rotary support in the form of a rotatable collar 162. Unitary with the rotatable collar 162 is a transverse bearing 164 which serves the same function as the previously described bearing 118, that is to say, which receives the removable pivot pin 115 for connecting the vehicle-engaging means 28 with the fixed portion of the dolly frame with freedom for relative rotation of the vehicle-engaging means up and down about a transverse axis.

A further modification incorporated in the construction of the second embodiment of the invention is the provision of releasable means to immobilize rotation of the vehicle-engaging means with respect to the axis of the upright pivot bolt 105, such immobilization being required to shift the upright axis of rotation of the universal joint assembly 32a to the axis of the rotary support or collar 162.

As shown in Figures 12 and 13, the immobilizing means may comprise a locking plate 160 that is hingedly connected by a hinge pin 166 to an angular base plate 168. The base plate 168 is positioned inside the transverse channel 30a of the vehicle-engaging means 28a and is fixedly attached to the web of the channel 30a by attachment elements 170. The locking plate 165 is cut away to U-shaped configuration to provide a pair of arms 172 that are dimensioned to straddle that bearing block 108a of the first upright plate 104a in a manner to prevent rotation of the bearing block relative to the channel 30a. The ends of the arms 172 may abut the rear face of the first upright plate 104a in close contact therewith as further means to prevent such relative rotation. The locking plate 165 is shown in its effective immobilizing position in Figures 12 and 13 and may be swung down from this position to release the bearing block and the first upright plate for relative rotation.

This second embodiment of the invention is operated in substantially the same manner as the first embodiment. When the lift frame 26a carries the end of a disabled truck to the upper towing position, however, a somewhat different procedure is followed. The removable pivot pin 115 is employed in the usual manner to connect the vehicle-engaging means 28 with the transverse bearing 164 on the rotatable collar 162, but then the lifting frame 26a is completely disconnected from the vehicle-engaging means 28a to permit the desired rotation thereof about the axis of the heavy column 160. The pivot bolt 80a is removed to disconnect the lift frame 26a and then the stop screw 84a is retracted for retraction of the shank member 78a to lower the upper end of the lift frame out of the orbital path of the ears 88a. When the locking plate 165 is then elevated to its effective position, the channel 30a of the vehicle-engaging means 28a will rotate about the axis of the upright column 160 as indicated in Figure 13 such rotation being permitted by the rotary collar 162.

My description in specific detail of the selected embodiments of the invention will suggest various changes, substitutions and other departures from my disclosure within the spirit and scope of the appended claims.

I claim:

1. A dolly to tow a disabled automotive vehicle comprising: a dolly frame for attachment to a towing vehicle; a pair of ground wheels on a common transverse axis supporting said dolly frame; vehicle-engaging means to fixedly engage an end of a disabled vehicle; a lift frame included in said dolly frame and hingedly mounted by one of its ends, said vehicle-engaging means being pivotally mounted on the swinging end of said lift frame; means to swing said lift frame from a rearward lower position near ground level to a forward upper position to carry said vehicle-engaging means to an elevated towing position and to impose the weight of the disabled vehicle on the dolly frame forward of said transverse wheel axis; and means to maintain said vehicle-engaging means at its elevated towing position for a towing operation with freedom for the vehicle-engaging means to pivot relative to the dolly frame about an upwardly extending axis and a forwardly extending axis and to pivot to a limited extent relative to the dolly frame about a transverse axis.

2. A combination as set forth in claim 1, which includes a universal joint assembly to connect said vehicle-engaging means to said lift frame; and which includes means to releasably anchor said assembly at the elevated position of said vehicle-engaging means.

3. A dolly to tow a disabled automotive vehicle comprising: a dolly frame for attachment to a towing vehicle, said frame having a first base portion and a second fixed upright portion; ground wheels supporting said frame; a lift frame hingedly mounted by one end on said dolly frame; means to swing said lift frame relative to the dolly frame from a lower rearward position near ground level to a forward upper position adjacent said second portion of the dolly frame; vehicle-engaging means on the swinging end of said lift frame to fixedly engage one end of a disabled vehicle for lifting of the end by said lift frame to an elevated towing position on the dolly frame, said vehicle-engaging means being movable relative to said lift frame about a transverse axis to follow the changing angle between the lift frame and the disabled vehicle during the lifting operation; and means to releasably anchor said vehicle-engaging means to said second portion of the dolly frame when said lift frame is at its upper position, said vehicle-engaging means being movable relative to said second portion of the dolly frame at its anchored position to permit changes in angle between the dolly frame and the disabled vehicle during a towing operation.

4. A combination as set forth in claim 3, in which said vehicle-engaging means is movable relative to said lift frame about a longitudinal axis to permit lateral canting of the vehicle-engaging means in accord with the lateral cant of the disabled vehicle.

5. A combination as set forth in claim 3, in which said vehicle-engaging means is mounted on the swinging end of a said lift frame by a universal joint providing three axes of rotation perpendicular to each other.

6. A dolly to tow a disabled automotive vehicle comprising: a dolly frame for attachment to a towing vehicle, said frame having a first base portion and a second upright portion; ground wheels supporting said frame and rotating about a common transverse axis; a lift frame hingedly mounted by one end on said dolly frame; means to swing said lift frame relative to the dolly frame from a lower rearward position near ground level to an upper position adjacent said second portion of the dolly frame and disposing the weight of the vehicle forward of the transverse wheel axis; vehicle-engaging means to fixedly engage one end of a disabled vehicle to cooperate with said lift frame for lifting the end of the disabled vehicle to a towing position; means pivotally connecting said vehicle-engaging means with the swinging end of said lift frame to permit changes in position between the vehicle-engaging means and the lift frame during the upward movement of the lift frame; and means to anchor said vehicle-engaging means to said second portion of the dolly frame at the upper position of the lift frame.

7. A dolly to tow a disabled automotive vehicle comprising: a dolly frame for attachment to a towing vehicle, said frame having a first base portion and a second upright portion; ground wheels supporting said frame; a lift frame hingedly mounted by one end on said dolly frame; means to swing said frame relative to the dolly frame from a lower rearward position near ground level to an upper position adjacent said second portion of the dolly frame; vehicle-engaging means to fixedly engage one end of the disabled vehicle; means to pivotally and releasably connect said vehicle-engaging means with the swinging end of said lift frame for cooperation therewith to lift the end of the disabled vehicle to towing position; and means to releasably connect said vehicle-engaging means with said second portion of the dolly frame in a pivotal manner for towing the disabled vehicle whereby said vehicle-engaging means may be mounted on said lift frame for the lifting operation and then may be connected to said second portion of the dolly frame and disconnected from said lift frame for the towing operation.

8. A combination as set forth in claim 7, in which a rotary support means with an upright axis of rotation is mounted on said second portion of the dolly frame, said vehicle-engaging means being releasably attachable to said support means.

9. A dolly to tow a disabled automotive vehicle comprising: a dolly frame for attachment to a towing vehicle, said frame having a first base portion and a second upright portion; ground wheels supporting said frame; a lift frame hingedly mounted by one end on said dolly frame; means to swing said lift frame relative to the dolly frame from a lower rearward position near ground level to an upper position adjacent said second portion of the dolly frame; vehicle-engaging means on the swinging end of said lift frame to fixedly engage an end of a disabled vehicle for lifting of the vehicle end by the lift frame to a towing position adjacent said second portion of the dolly frame; means pivotally connecting a portion of said vehicle-engaging means with said lift frame to permit pivotal movement of the vehicle-engaging means relative to the lift frame about a transverse axis to follow changes in angle between the lift frame and the disabled vehicle during the lifting operation; and means to limit rearward rotation of the said vehicle-engaging means about said transverse axis while said lift frame is at a lower position prior to engagement of the vehicle-engaging means with the disabled vehicle.

10. A combination as set forth in claim 9, in which said limiting means links a second portion of said engagement means with a portion of said dolly frame.

11. A combination as set forth in claim 10, in which said second portion of the vehicle-engaging means is releasably attachable to said linking means and is releasably attachable to said second portion of the dolly frame for rotation relative to the second portion of the dolly frame about a second transverse axis.

12. A combination as set forth in claim 11, in which said lift frame is longitudinally extensible to permit slight shift of said first mentioned transverse axis relative to the hinge axis of the lift frame thereby to permit rotation of said vehicle-engaging means about said second axis when the vehicle-engaging means is pivotally connected to both the lift frame and the second portion of the dolly frame.

13. A combination as set forth in claim 3, in which said means to swing the lift frame includes: a cable connected to the swinging frame; a winch on said dolly frame to wind in said cable; and crank means to actuate said winch.

14. A combination as set forth in claim 13, which includes motor means to actuate said winch and a storage battery to energize said motor.

15. A combination as set forth in claim 3, in which the front end of said dolly frame is tiltable from a lower position to an upper towing position for attachment to a towing vehicle; in which said ground wheels are provided with brakes; and which includes means for contact with the ground when the front end of the dolly frame is disconnected from the towing vehicle, said brakes being responsive to said ground contacting means to stop the dolly in the event the dolly breaks loose from the towing vehicle.

16. A combination as set forth in claim 1, in which said ground wheels comprise wheel assemblies, each of said wheel assemblies including: a hub structure having an upright face, said hub structure being rotatably mounted on said dolly frame; and a wheel cylinder carrying two tires side by side, said wheel cylinder having a central transverse web spanning the interior of the cylinder midway between said two tires, said central web being releasably connectable to said face of the hub structure and being reversible relative to the hub structure to place either of said two tires on the outside.

17. A dolly to tow a disabled automotive vehicle comprising: a dolly frame for attachment to a towing vehicle, said frame having a first base portion and a second upright portion; ground wheels supporting said frame; a lift frame hingedly mounted by one end on said dolly frame; means to swing said lift frame relative to the dolly frame from a lower rearward position near ground level to an upper position adjacent said second portion of the dolly frame; vehicle-engaging means to fixedly engage an end of a disabled vehicle; a universal joint assembly connected to said vehicle-engaging means for support thereof, said joint assembly being releasably attachable to the swinging end of said lift frame for lifting of the end of the disabled vehicle by the lift frame to an upper towing position, said joint assembly having a transverse axis, an upright axis, and a longitudinal axis; rotary support means mounted on said second portion of the dolly frame for rotation relative thereto about an upright axis, said universal joint assembly being releasably attachable to said rotary support means to transmit the weight of the disabled vehicle thereto; and means to immobilize said joint assembly with respect to rotation about its upright axis when the rotary joint assembly is attached to said rotary support means.

18. A dolly to tow a disabled automotive vehicle comprising: a dolly frame for attachment to a towing vehicle; a pair of ground wheels on a common transverse axis supporting said dolly frame; vehicle-engaging means to fixedly engage an end of a disabled vehicle; a lift frame included in said dolly frame and hingedly mounted by one of its ends; universal joint means mounting said vehicle-engaging means on the swinging end of said lift frame; means to swing said lift frame from a rearward lower position near ground level to a forward upper position to carry said vehicle-engaging means to an elevated towing position and to impose the weight of the disabled vehicle on the dolly frame forward of said transverse wheel axis; and means to releasably connect said vehicle-engaging means with said dolly frame at the forward upper position of said lift frame for transportation of the disabled vehicle.

References Cited in the file of this patent

UNITED STATES PATENTS

| | | |
|---|---|---|
| 2,058,473 | LeTourneau | Oct. 27, 1936 |
| 2,720,988 | McColl | Oct. 18, 1955 |
| 2,746,771 | Gross | May 22, 1956 |

FOREIGN PATENTS

| | | |
|---|---|---|
| 256,334 | Great Britain | Aug. 9, 1926 |
| 941,345 | Germany | Apr. 5, 1956 |